(12) United States Patent
Plante

(10) Patent No.: US 7,765,954 B2
(45) Date of Patent: *Aug. 3, 2010

(54) SMALL ANIMAL HABITAT

(75) Inventor: Robin Plante, Sainte-Barbe (CA)

(73) Assignee: Rolf C. Hagen, Inc., Montreal (CA)

( * ) Notice: Subject to any disclaimer, the term of this patent is extended or adjusted under 35 U.S.C. 154(b) by 0 days.

This patent is subject to a terminal disclaimer.

(21) Appl. No.: 12/568,984

(22) Filed: Sep. 29, 2009

(65) Prior Publication Data

US 2010/0037831 A1    Feb. 18, 2010

Related U.S. Application Data

(62) Division of application No. 11/799,045, filed on Apr. 30, 2007, now Pat. No. 7,624,705.

(51) Int. Cl.
*A01K 1/02* (2006.01)
(52) U.S. Cl. .................. 119/474; 119/499; 119/498
(58) Field of Classification Search .......... 119/452, 119/417, 416, 482, 475, 453, 454, 455, 456, 119/458, 472, 473, 474, 487, 489, 490, 491, 119/492, 493, 494, 496, 498, 499, 500, 501, 119/170, 161, 163, 165, 166, 168, 169, 28.5; 220/252, 350
See application file for complete search history.

(56) References Cited

U.S. PATENT DOCUMENTS

| 2,250,729 | A | * | 7/1941 | Smith et al. | 220/252 |
|---|---|---|---|---|---|
| 3,742,908 | A | * | 7/1973 | Merino | 119/455 |
| 3,785,347 | A | * | 1/1974 | Dinnerstein | 119/700 |
| 3,788,277 | A | * | 1/1974 | Willinger et al. | 119/700 |
| 3,791,346 | A | * | 2/1974 | Willinger et al. | 119/456 |
| 3,964,438 | A | * | 6/1976 | Rodemeyer | 119/28.5 |
| 5,722,348 | A | * | 3/1998 | Phillips et al. | 119/452 |
| D444,921 | S | * | 7/2001 | Plante | D30/108 |
| 6,494,502 | B1 | * | 12/2002 | Plante | 285/373 |
| 2007/0074667 | A1 | * | 4/2007 | Quinn | 119/28.5 |
| 2007/0125306 | A1 | * | 6/2007 | Beecher | 119/51.02 |
| 2008/0066687 | A1 | * | 3/2008 | Leung | 119/28.5 |

* cited by examiner

*Primary Examiner*—Trinh T. Nguyen
(74) *Attorney, Agent, or Firm*—Wolf, Greenfield & Sacks, P.C.

(57) ABSTRACT

A small animal habitat having a base and removable hood composed of a plurality of lune-shaped hood sections that are movable with respect to one another enabling them to be nested one above another so that the front and/or back of the hood may be opened. Hubs that connect the hood sections together and mount the hood to the base also define passages for the animal in and out of habitat and provide access to other habitat components.

8 Claims, 11 Drawing Sheets

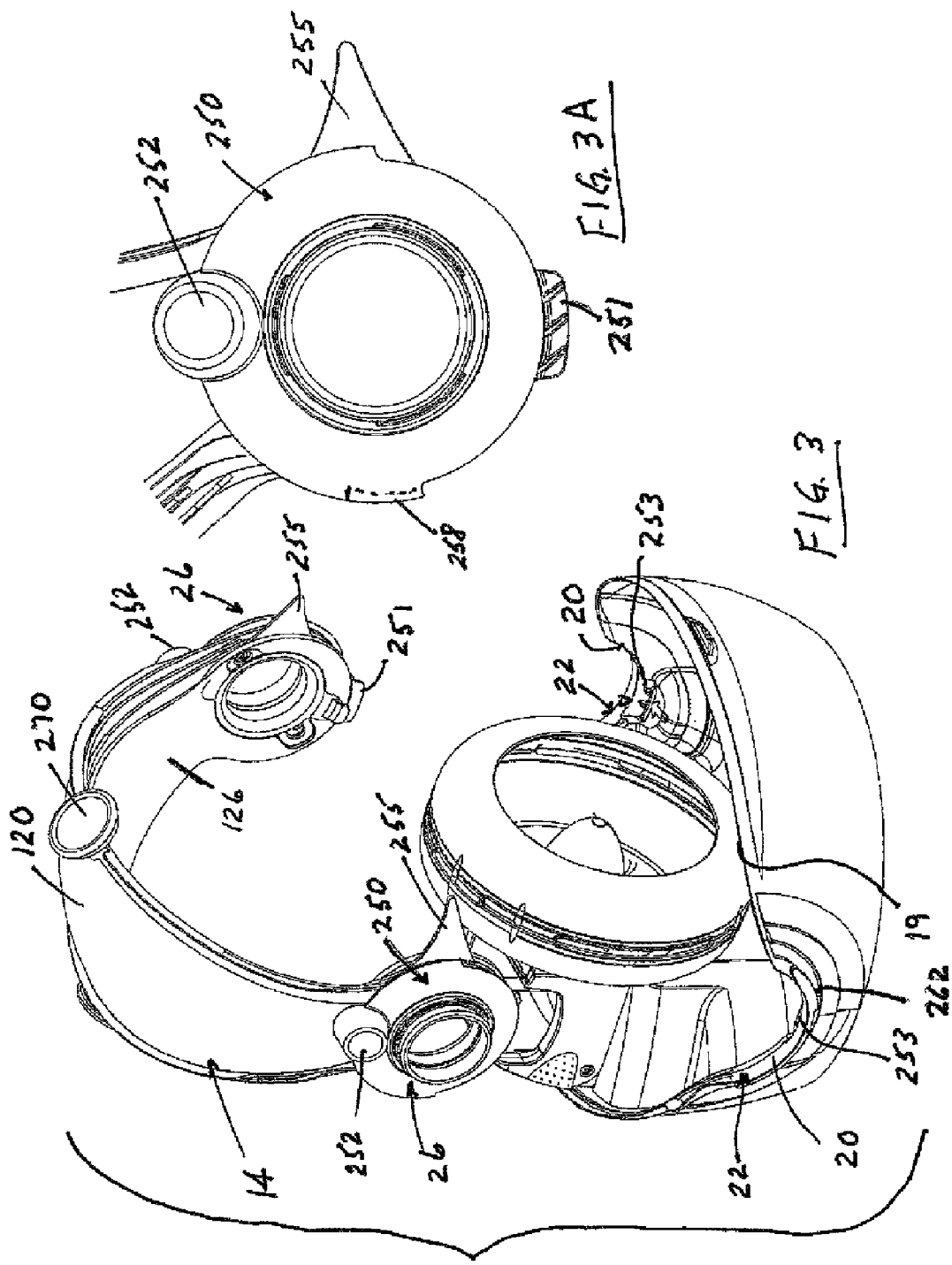

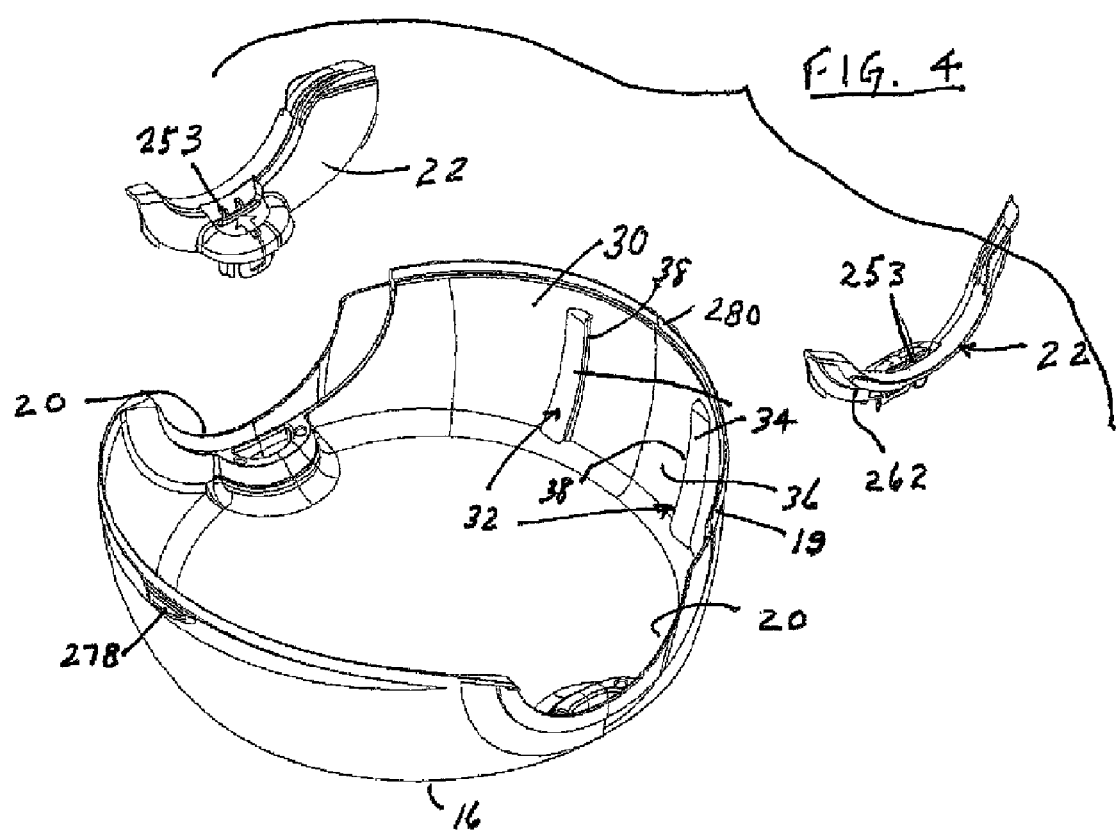

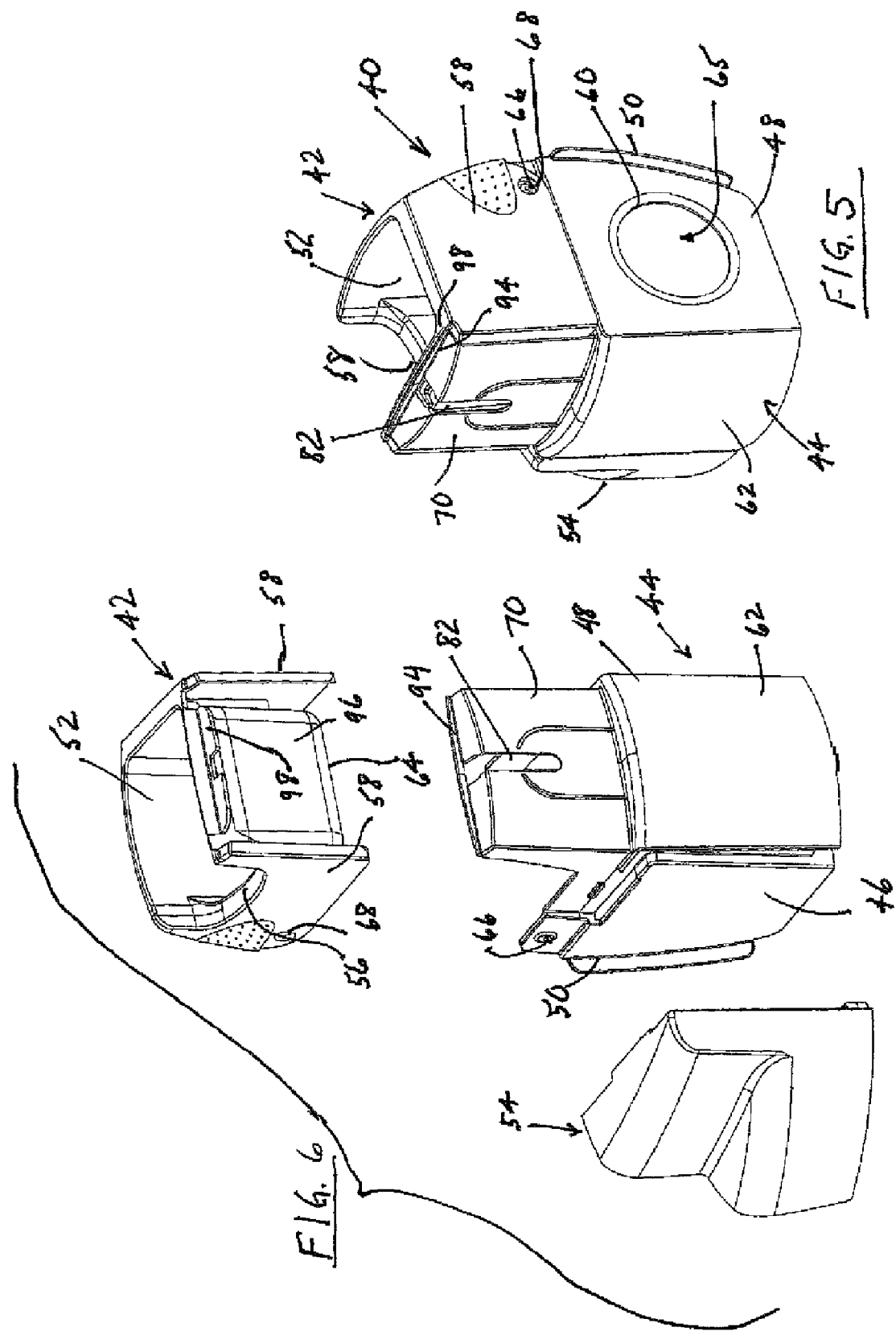

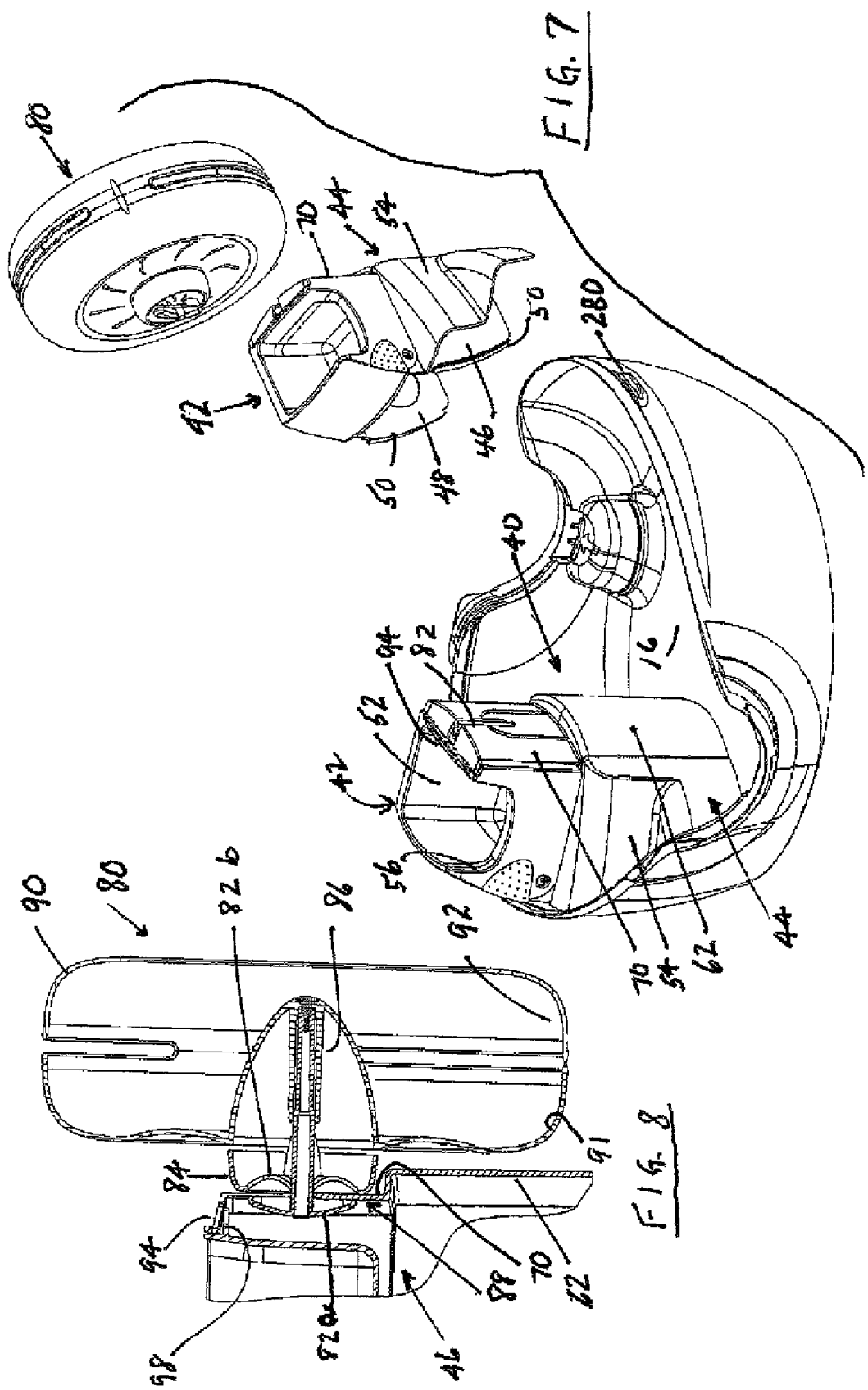

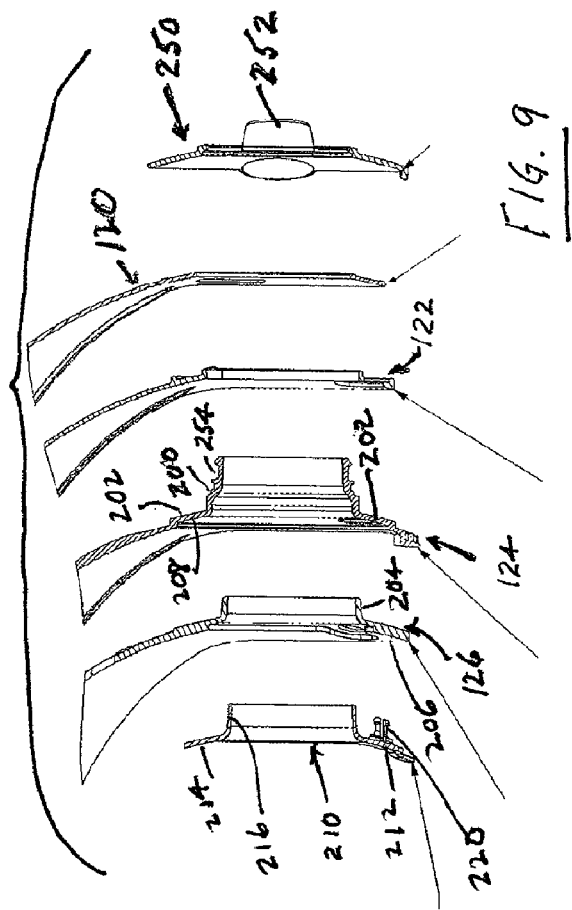
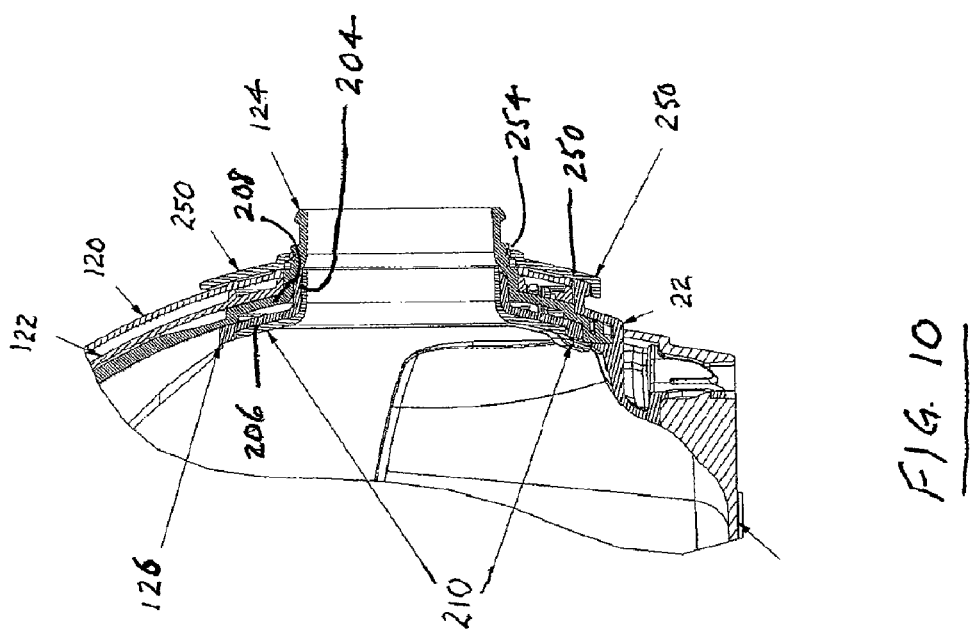

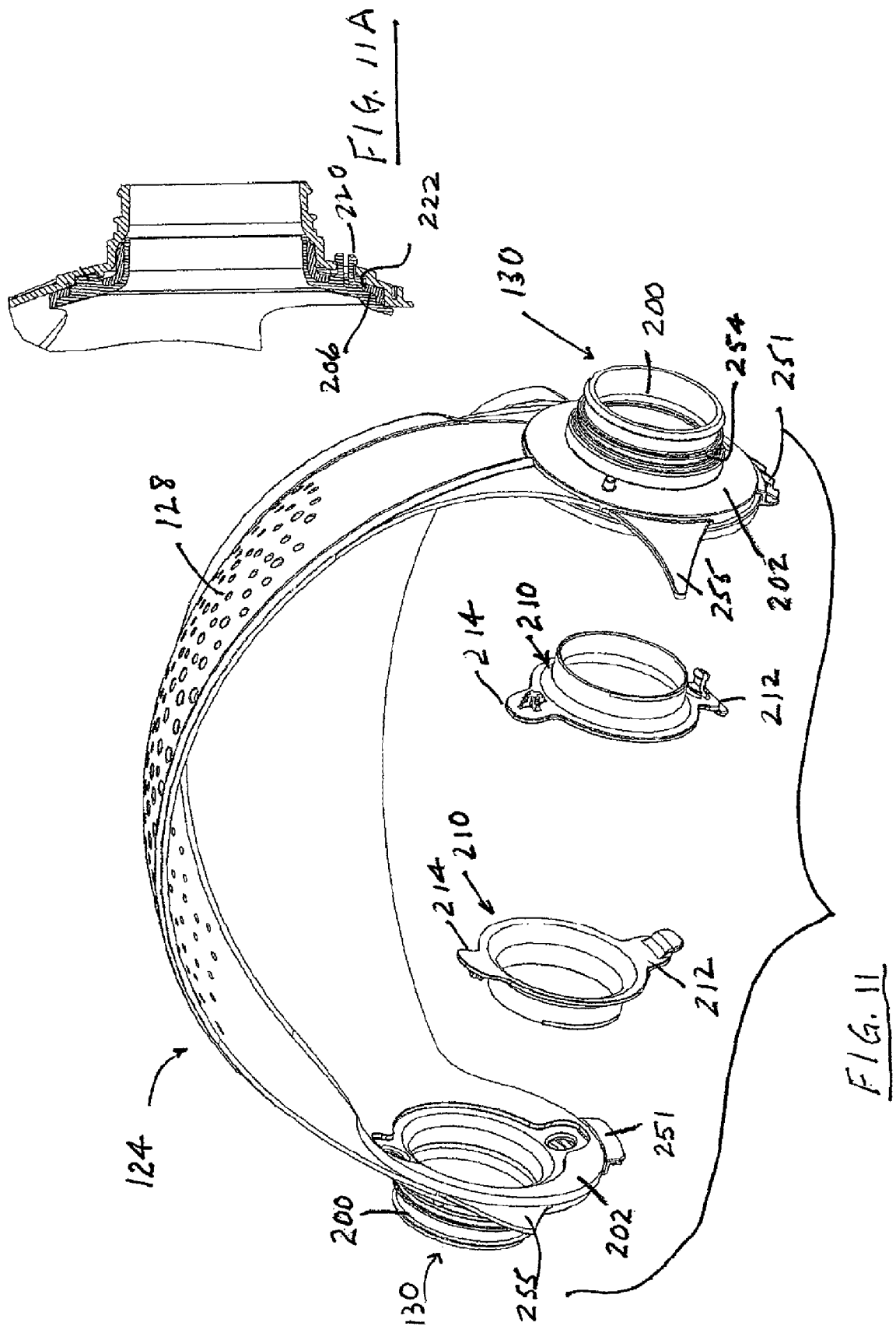

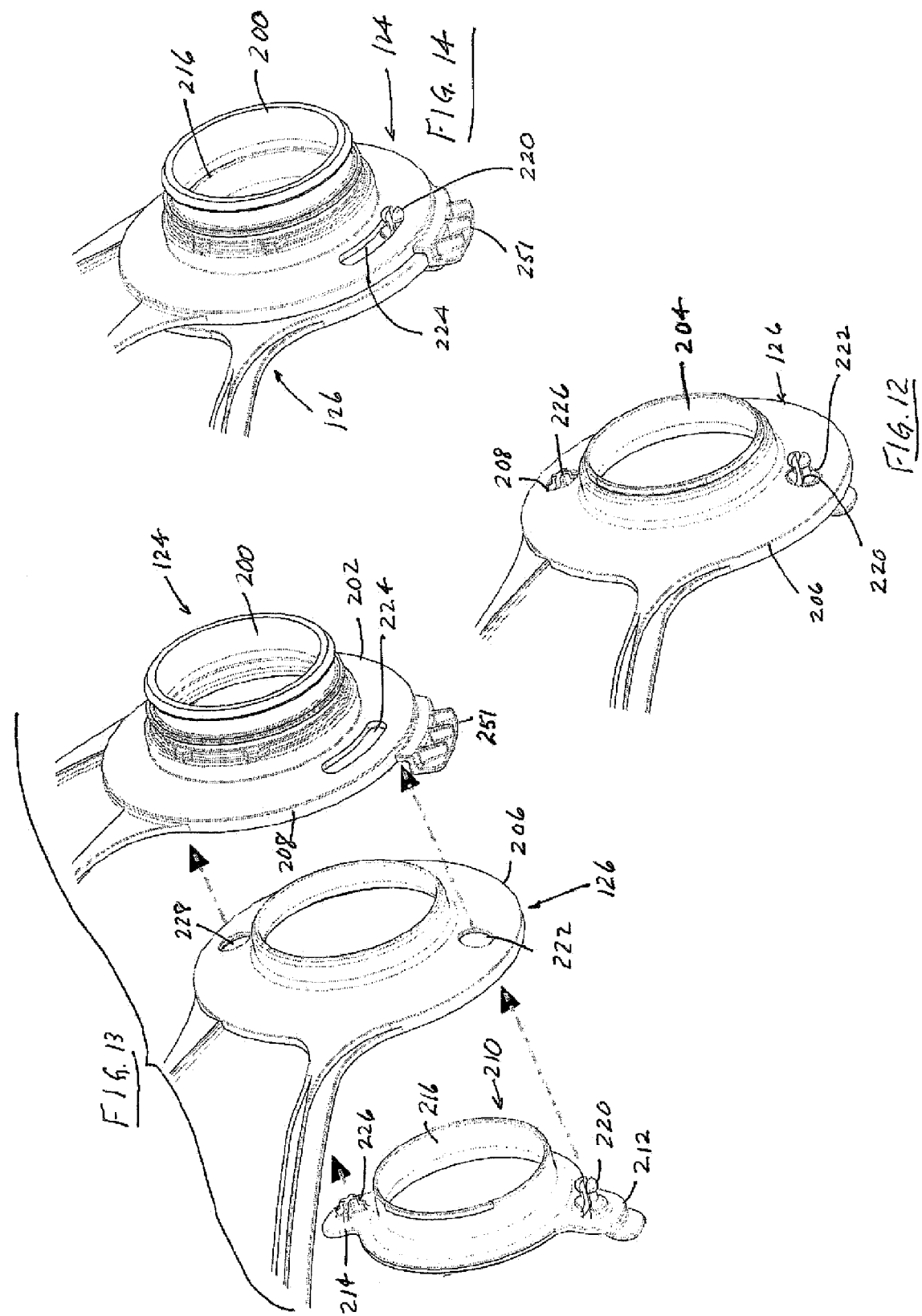

SMALL ANIMAL HABITAT

RELATED APPLICATIONS

This application is a divisional of U.S. application Ser. No. 11/799,045, entitled "SMALL ANIMAL HABITAT," filed on Apr. 30, 2007, which is herein incorporated by reference in its entirety.

BACKGROUND OF INVENTION

1. Field of Invention

This invention relates to small animal cages and more particularly comprises a home and play habitat for hamsters and other like animals that may be used alone or be assembled with other animal habitat components.

SUMMARY OF INVENTION

In accordance with one aspect of this invention, the small animal habitat of the present invention is constructed of molded plastic parts and free of wire cage-like sections.

In accordance with another aspect of the invention, the main cage of the habitat has a base with high side walls and a separate removable hood or top.

In accordance with another aspect of the present invention, the cage has a retractable hood that allows easy front and back access to the interior.

In accordance with another aspect of the invention, the habitat has a water supply that is easy to reach and refill, is located outside the main cage, and easily connected to and disconnected from the main habitat structure.

In accordance with yet another aspect of the present invention, the base and retractable roof combination is of generally round configuration, is free of corners and thus easy to clean. The retractable hood provides easy access to the pet, a food dish, exercise wheel, hut and other equipment within the cage. When used with compatible habitat structures, the present invention improves the totality of the animal home so as to duplicate the natural living environment of the animal. More particularly, the habitat increases the freedom to travel, exercise, discover, hoard and sleep as it would in its natural habitat.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 2A is a side view of the cage with the retractable hood closed;

FIG. 2B is a side view of the cage with both of the front hood sections retracted to open the cage front;

FIG. 2C is a side view of the cage with the rear hood section retracted to open the rear of the cage;

FIG. 2D is a side view of the cage with both the front and rear hood sections retracted to further open the cage;

FIG. 3 is a perspective view of the small animal cage with the retractable hood detached from the base and partially exposing the cage interior;

FIG. 3A is a fragmentary side view of the hub assembly of the hood with the locking ring in the unlocked position;

FIG. 4 is a perspective view of the cage base with its hood support fixtures detached;

FIG. 5 is a perspective view of the support station of the cage that in use is disposed inside and at the rear of the cage;

FIG. 6 is an exploded perspective view of the support station shown in FIG. 5;

FIG. 7 is an exploded rear perspective view showing the cage base, support station and wheel assembly;

FIG. 8 is a fragmentary cross-sectional view of the support station and wheel assembly;

FIG. 9 is a fragmentary exploded view of the several segments of the cage hood assembly;

FIG. 10 is a fragmentary cross-sectional view of the assembled hood assembly mounted on the base;

FIG. 11 is an exploded perspective view of the hood main and rear sections and hood inserts;

FIG. 11A is a fragmentary cross-sectional view of the assembled main and rear hood sections and insert;

FIG. 12 is a fragmentary perspective view of one end of the assembled rear hood section and hood insert;

FIG. 13 is an exploded fragmentary perspective view of one end of the main and rear hood sections and the hood insert;

FIG. 14 is a fragmentary perspective view of one end of the assembled main and rear hood sections and hood insert;

DETAILED DESCRIPTION

Figure 1:
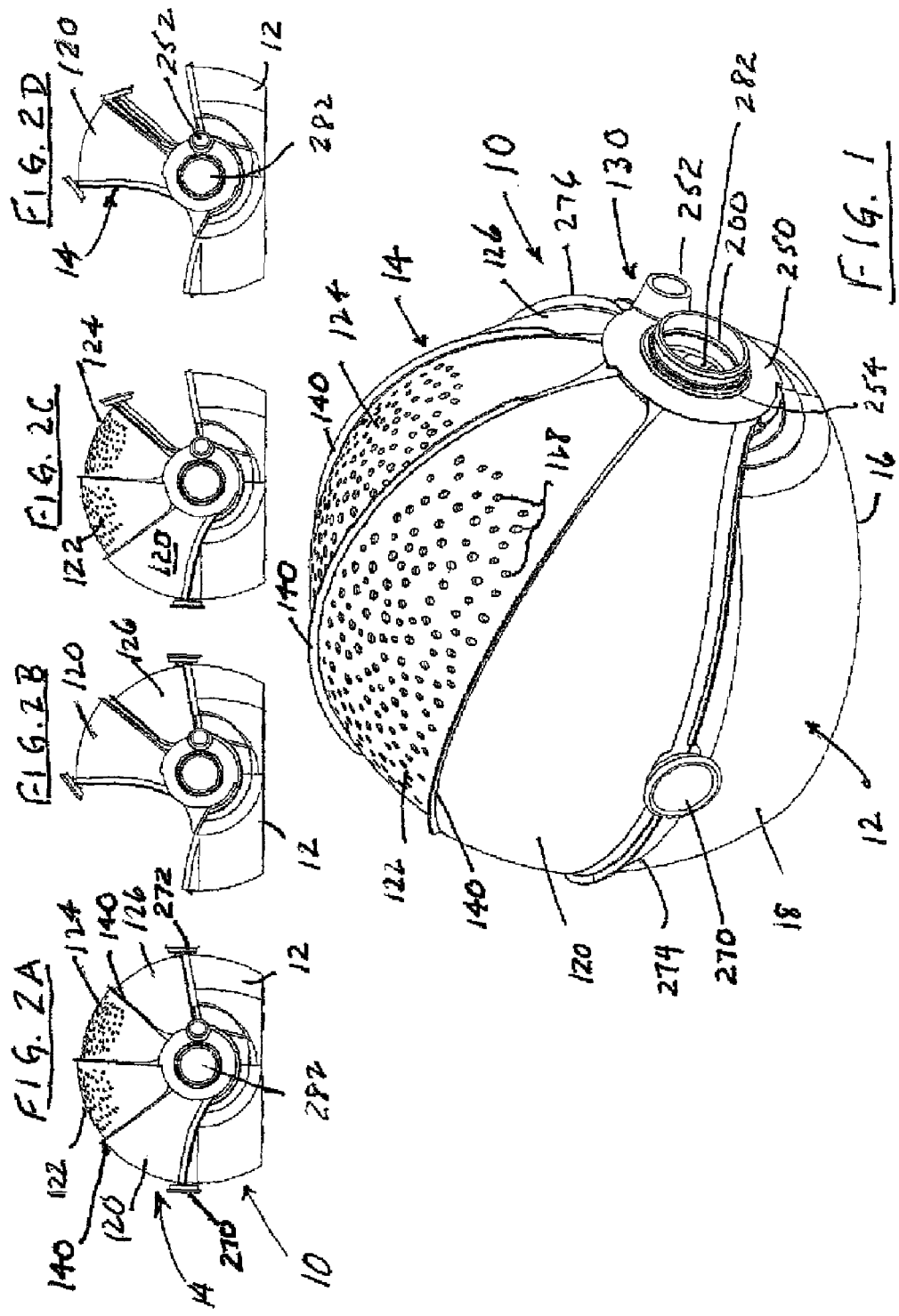
FIG. 1 is a perspective view of the small animal cage embodying the present invention.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The small animal habitat of this invention comprises a cage 10 having a base 12 and a retractable hood or roof 14 that together define an enclosure for the animal. When the hood is closed as shown in FIG. 1, in the preferred embodiment the cage is generally ball-shaped but has a flat bottom 16 so that the cage will rest in a stable position on a table, floor or other flat surface. The invention is not, however, limited to that specific configuration. The base has a peripheral side wall 18 extending upwardly from the edge of the bottom 16 and provides a relatively deep enclosure so as to confine food and waste within the cage.

On opposite sides of the side wall 18, the rim 19 of the base has semicircular recesses 20 (see FIG. 4) that are aligned with one another and carry support fixtures 22 that provide seats for the hub assemblies 26 of the retractable hood 14 as described more fully below. Typically the base should be made of a molded plastic material such as ABS or other hard plastic that is chew resistant to small animals such hamsters. In the embodiment shown the base is opaque, but it may be transparent or translucent. The hood in the preferred embodiment is either transparent or translucent and made of ABS, nylon, Lexam or other chew resistant material.

As is shown in FIG. 4, the side portion 30 of the side wall 18 carries a pair of ribs 32 having flanges 34 spaced from the inner surface 36 of the side wall 18 and that define a pair of spaced-apart slots 38 that engage a support station 40 removably mounted in the cage. The support station 40 in the embodiment illustrated in FIGS. 5-7 has upper and lower sections 42 and 44 that perform separate functions. The lower portion 44 is generally U-shaped in horizontal cross-section and its side walls 46 and 48 carry flanges 50 at their edges that register with the slots 38 on the inside surface of the side wall of the base to hold the support 40 in place. The upper section 42 of the support which preferably is detachably connected to section 44 has a feeding bowl 52 disposed an appreciable distance above the bottom 16 of the base. Stairs 54 attached to the bottom portion 44 provide easy access up to the opening 56 in the side wall 58 that partially defines the bowl 52. In the embodiment shown, the upper section 42 of the support is separable from the lower section 44 so that the two parts can be conveniently cleaned. In the embodiment shown, the stairs 54 are similarly separable from the lower portion 44 of the support, but the parts may be preassembled by the manufacturer.

As shown in FIG. 5, the side wall 48 of the lower section 44 of support 40 has an opening 60 that provides access to the interior of the bottom section 44 of the support when the support is assembled in the base. Thus, a housing 65 for the animal is defined by the side walls 46 and 48 and the front wall 62 of the lower section 44, and by the bottom wall 64 of the upper section 42 along with the base bottom wall 16.

The upper and lower sections 42 and 44 of the support are detachably held together in the embodiment illustrated by posts 66 formed on the tops of the side walls 46 and 48 of the lower section 44 of the support, which register with the openings 68 in the side walls 58 of the upper section 42. The lower section 44 of the support 40 also carries an upstanding plate 70 generally aligned with the front wall 62. The plate provides a support for the wheel assembly 80 shown in FIG. 7. The plate 70 includes a vertical slot 82 that is open at its upper end to engage the hub 84 of the freely rotating wheel assembly 80.

The wheel assembly 80 (see FIG. 8) includes a shaft 86 in the hub 84 that extends through the slot 82 and carries a split hanger 88 having two sides 82a and 82b that engage the inside and outside faces of the plate 70. The rim 90 of the wheel assembly has an inner track 92 large enough to receive a small animal such as a hamster occupying the cage. When the animal runs on the track, the wheel rotates enabling the animal to run substantially in place. The top portion 94 of plate 70 cooperates with a rib 98 adjacent the upper edge of the wall 96 of the upper section of the support to hold the upper section in place. The upper and lower sections 42 and 44 of the support 40 may be separated simply by squeezing the side walls 46 and 48 together so as to disengage the posts 66 and holes 68. The support 40 is also preferably made of ABS, nylon, Lexam or other plastic material which is chew resistant. The wheel assembly may be mounted in other ways on its support but it is particularly advantageous to have it mounted on a plastic support rather than a wire or metal support, as the assembly generates little or no noise.

In accordance with other embodiments of the invention, the support 40 may be formed in many different shapes and may either be a unitized or multi-component construction, and the wheel assembly may be mounted on the support in a variety of different ways. It should be appreciated that the present invention is not limited to the support described.

In FIGS. 9-16 details of one embodiment of the hood 14 of the habitat are shown. In the illustrated embodiment, the hood 14 is comprised of a plurality of crescent or lune-shaped sections 120, 122, 124, and 126. While four sections are shown in the preferred embodiment, a smaller or larger number may be employed. In accordance with one embodiment of the invention, sections 122 and 124 are perforated (see FIG. 10) to provide circulation of air in the cage when the hood is closed. The other two sections 120 and 126 in the illustrated embodiment are imperforate, but it should be appreciated that fewer or greater number of sections may be perforated, and the shape of the holes 128, while shown as round in the illustrated embodiment may take other shapes as well. Each hood section has its two ends attached to the hub assembly 130 on each side, and the hub assemblies permit the sections to move with respect to one another so as to open or close the habitat. The sections are preferably molded of a non-chewable plastic such as ABS, SAN or polycarbonate, but other materials may also be used.

In the preferred embodiment shown, the hood section 124 remains in a fixed position when the hood is mounted on the base via the support fixtures 22 disposed on the semi-circular recesses 20 in the base side wall 18 (see FIG. 3). Section 124 may be considered to be the main hood section. As shown in FIGS. 9-13, section 124 has a circular collar 200 and flange 202 at each end with the two axially aligned with one another. Hood section 126, the rear hood section, has a collar 204 and a flange 206. The flange 206 slidably lies against the inner surface 208 of flange 202 of hood section 124 with the collar 204 extending a short distance outwardly into the collar 200 of main section 124. The flange 206 on its inner surface, carries an insert 210 having a pair of outwardly extending tabs 212 and 214 and a circular collar 216 (see FIG. 13). When the insert 210 and roof sections 124 and 126 are assembled together, insert collar 216 extends into the collar 204 of section 126 and a snap fastener 220 mounted on the outer face of insert tab 212 extends through an opening 222 in flange 206 (see FIG. 12) and into an arcuate slot 224 in the flange 202 of hood section 124 (see FIG. 14). A guide post 226 carrier on the other insert tab 214 engages the margins of a second opening 228 in the flange 206 of hood section 126 (see FIG. 12) further maintaining the circumferential alignment of the insert 210 with the first hood section 126 (see FIGS. 12-14).

Figure 15:
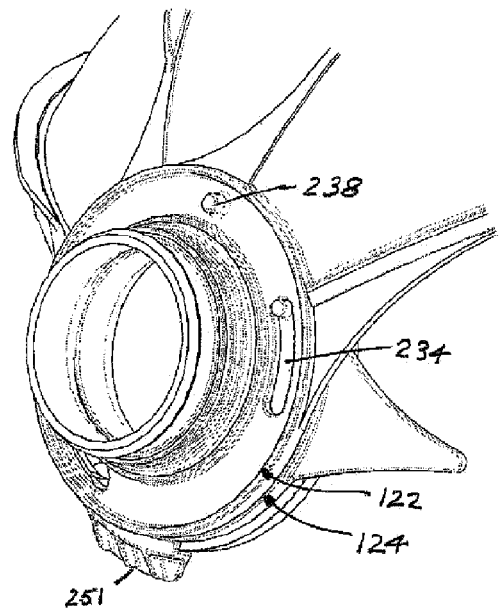
FIG. 15 is a fragmentary perspective view of one end of the assembled main and third or inner front hood sections.
Figure 16:
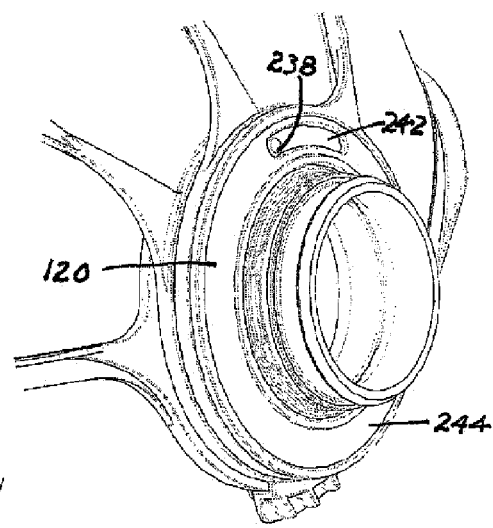
FIG. 16 is a fragmentary perspective view of one end of the assembled hood sections.
Figure 15A:
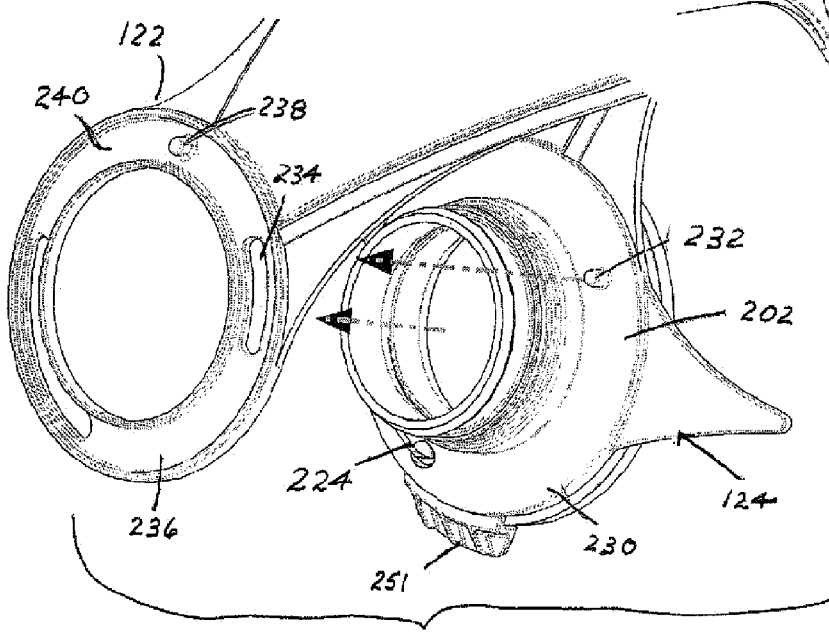
FIG. 15A is an exploded view of the main, rear and inner hood sections shown partly assembled.

Referring now to FIGS. 15 and 15A, the flange 202 of main hood section 124 on its outer side 230, carries a pin 232 that registers with an arcuate slot 234 formed in the flange 236 of hood section 122, to limit the rotation of section 122 with respect to the fixed main hood section 124. Similarly, a pin 238 on the outer surface 240 of flange 236 of hood section 122 engages arcuate slot 242 on the flange 244 of the front hood section 120 (see also FIG. 16). These pins and slots on the flanges of the hood sections control the relative rotational movements of the hood sections with respect to one another. The flanges 140 on the arcuate side edges of the hood sections further assist in controlling the relative movements of the hood sections. While the pin and slot arrangement is the preferred mode of controlling the relative rotation and angular relationship of the several hood sections, other mechanisms may be used to perform the same function, and the invention is not limited to the specific structure illustrated and described.

The hood is completed by locking rings 250 on the hub assemblies 130. Each ring 250 carries a handle 252 on its outer face (see FIGS. 1 and 10), and each ring 250 is seated in a track 254 on the collar 200 of main hood section 124, just outside the flange 244 of hood section 120. The ring 250 is made of a plastic material such as polystyrene, ABS, SAN and polypropylene and has sufficient flexibility enabling it to be pulled off the track if for any reason the hood is to be disassembled. The locking rings 250 releasably lock the hood 14 to the base 12. The hood is removable so as to permit knockdown of the cage for packaging purposes and also to facilitate assembling of the cage interior components and cleaning of the cage.

As shown in FIGS. 3, 3A and 11, the hub assemblies 130 on each side of the hood include tongues 251 as part of main hood section 124, that register with slots 253 in support fixtures 22. In the preferred embodiment, each hub also has an extension 255 at each end of the hood section 124 (see FIGS. 3 and 11) that should be pointed toward the front of the base 12 when the hood is to be attached to it. The extensions engage the rim 19 of the base as well as the support fixtures 22 when the tongues 251 register with their respective slots 253 in the fixtures. When the hood structure is properly positioned, the handles of the locking rings may be rotated toward the back of the cage.

As suggested in FIG. 3A, each locking ring 250 on its inner face 260 has a curved flange 258 positioned to engage the lower edge 262 (see FIG. 4) of the support fixture 22 seated in the semicircular recess 20 of the base 12. The locking rings 250 turn approximately 90° between the open position wherein flanges 258 are circumferentially beyond the edges 262 of the fixtures 22 with the handles in approximately the twelve o'clock position, and a locked position wherein the flanges 258 underly the edges 262 to hold the hood in place.

Figure 2:
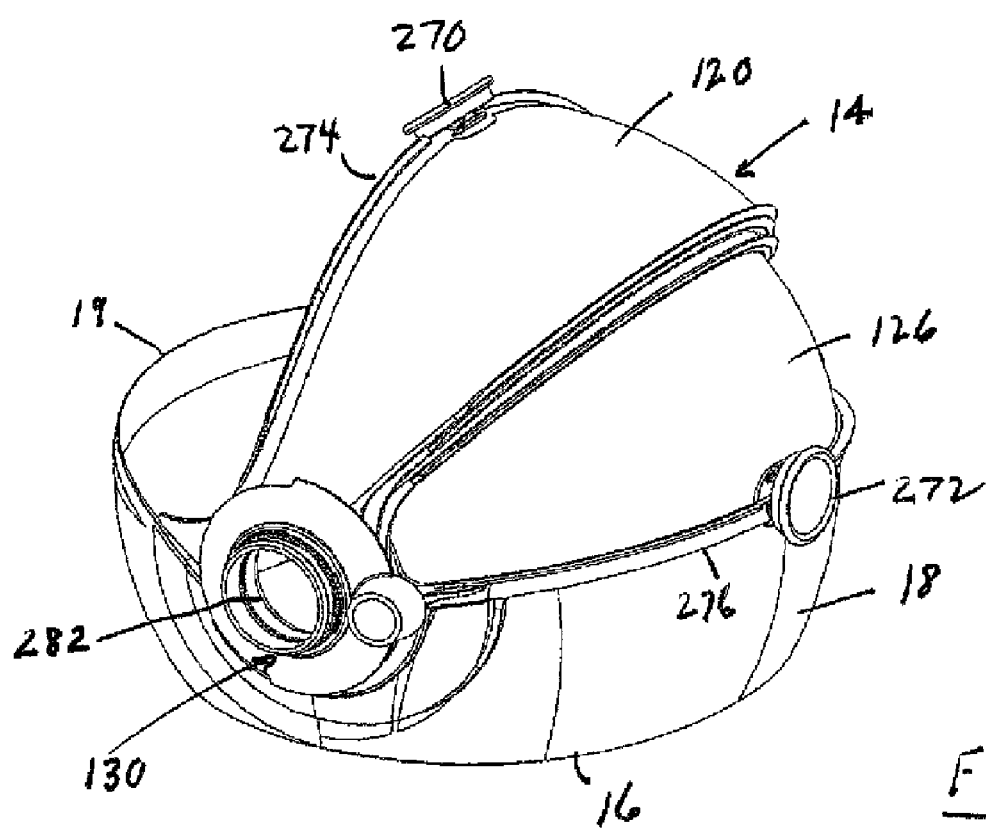
FIG. 2 is a perspective view of the small animal cage shown in FIG. 1 with the front portion of the hood in the fully retracted or open position.

When both hub assemblies (one on each side of the hood structure) are seated on the respective support fixtures and the locking rings 250 are moved to the locked position, the hood is fixed on the base. Either or both of the front hood sections 120 and 122 may be moved to their retracted positions above the section 124 (see for example FIG. 2B) and the rear section 126 may be moved to its retracted position beneath section 124 (see FIG. 2D), and sections 120, 122 and 126 may be moved to their closed positions as well. In addition, each of the front and rear hood sections may be moved independently of one another. To lock the respective hood sections 120, 122 and 126 in their closed positions, latches 270 and 272 are provided on the edges 274 and 276 of sections 120 and 126 respectively. The latches are pivotally mounted on the edges and are positioned to engage catches 278 and 280 on the rim 19 of the base. The latches are preferably also made of plastic material and in the preferred embodiment, are made of polypropylene.

Figure 17:
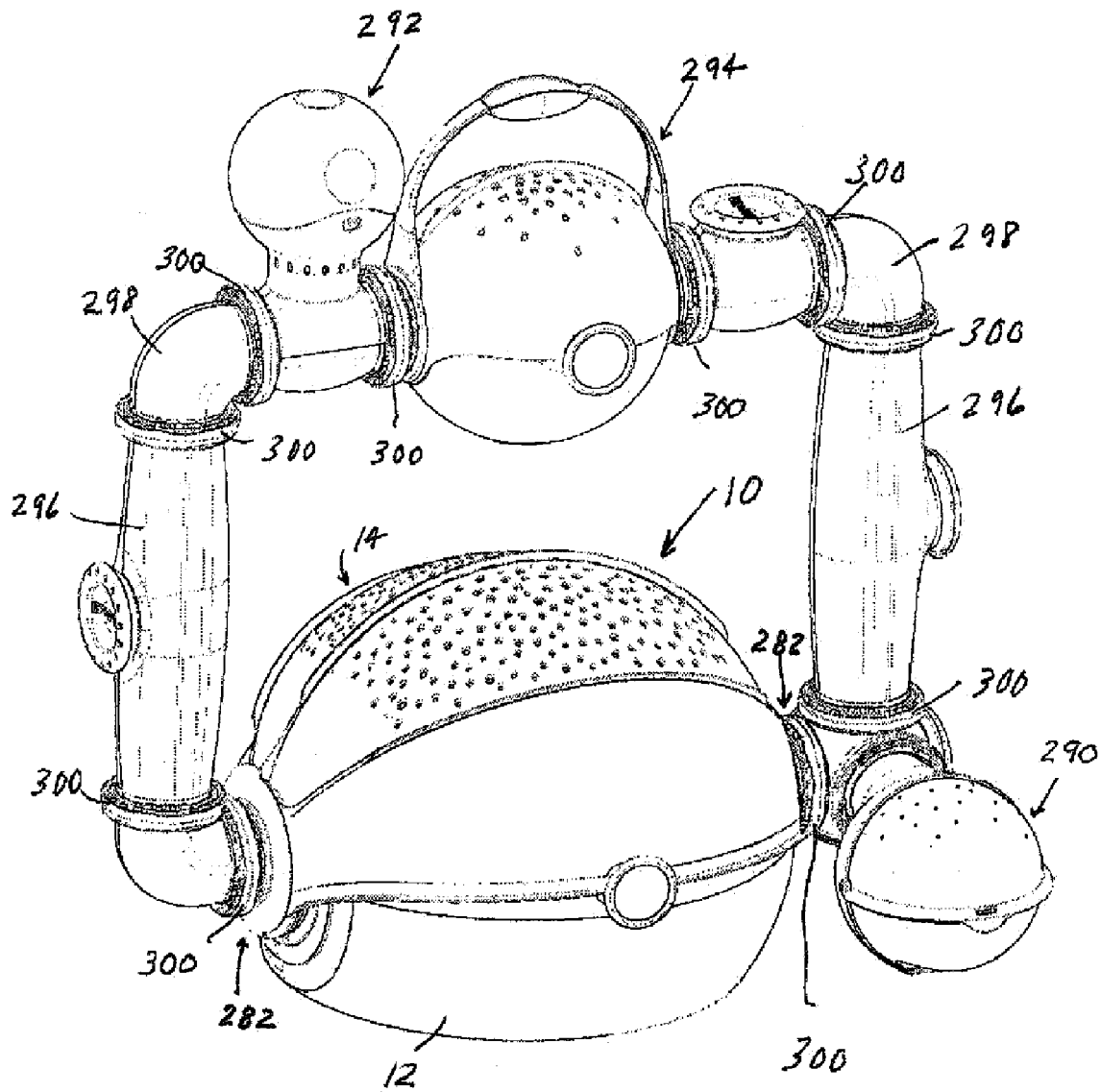
FIG. 17 is a perspective view of the cage of the present invention connected to an array of other components to enlarge the small animal habitat.

The hub assemblies of the hood on each side of the cage have relatively large passages 282 through the telescoped collars of the hood sections, that provide access to the cage interior. The passages 282 are provided to connect the cage to other parts of the small animal habitat. In FIG. 17 the cage 10 is shown connected to an array of attachments including a den 290, water bottle 292, and transport unit 294, all detachably connected directly or indirectly to the passages 282 at the hub assemblies by straight and angled tubular pieces 296 and 298. Obviously, other attachments may also be joined to the habitat. The passages as well as any of the attachments may be capped by a perforated or solid cover. The several components are coupled to the tubes and hub assemblies by connectors 300. An appropriate and preferred form of connector is shown in applicant's U.S. Pat. No. 6,494,502 granted Dec. 17, 2002, which is incorporated in its entirety herein by reference.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A small animal habitat comprising;
   a bowl-shaped base having a bottom wall and a side wall extending upwardly form the bottom walls, and an adjustable hood assembly for selectively covering the base,
   a pair of seats formed opposite one another in the side wall supporting the hood assembly for the habitat on the base, said hood assembly including a plurality of lune-shaped panels separately pivotally movable with respect to one another about a common axis extending through end portions of the panels and through the seats in the side wall of the base,
   and openings in the end portions of each of the lune-shaped panels disposed in the seats and providing access for small animals into and out of the habitat with the hood assembly mounted in the seats.

2. A small animal habitat as defined in claim 1 wherein the lune-shaped panels are nestable with one another so as to substantially open the hood to provide substantial access to the interior of the habitat.

3. A small animal habitat as defined in claim 2 wherein the openings in the lune-shaped panels remain coaxially aligned with one another in all positions of the lunes.

4. A small animal habitat as defined in claim 1 wherein the openings are provided in both ends of each of the panels.

5. A small animal habitat as defined in claim 1 wherein the lune-shaped panels each carry tracks surrounding the openings and operatively connecting the panels together for pivotal movement with respect to one another on the base.

6. A small animal habitat as described in claim 1 wherein at least one of the lune-shaped panels has an array of openings for circulating air in the habitat.

7. A small animal habitat as described in claim 1 wherein the hood is composed of at least four lune-shaped panels, at least, one of which is fixed with respect to the base and others are telescopically nestable with the fixed lune-shaped panel.

8. A small animal habitat as described in claim 1 wherein the side wall of the base is curvilinear.

\* \* \* \* \*